(12) United States Patent
Suri et al.

(10) Patent No.: US 8,493,902 B2
(45) Date of Patent: Jul. 23, 2013

(54) OPPORTUNISTIC LISTENING SYSTEM AND METHOD

(75) Inventors: Niranjan Suri, Pensacola, FL (US); Giacomo Benincasa, Gainesville, FL (US)

(73) Assignee: Florida Institute for Human and Machine Cognition, Pensacola, FL (US)

( * ) Notice: Subject to any disclaimer, the term of this patent is extended or adjusted under 35 U.S.C. 154(b) by 134 days.

(21) Appl. No.: 13/209,923

(22) Filed: Aug. 15, 2011

(65) Prior Publication Data

US 2012/0039231 A1 Feb. 16, 2012

Related U.S. Application Data

(60) Provisional application No. 61/374,073, filed on Aug. 16, 2010.

(51) Int. Cl.
*H04H 20/71* (2008.01)

(52) U.S. Cl.
USPC .......................................... 370/312; 370/465

(58) Field of Classification Search
USPC ................. 370/312, 326, 335–336, 342–342, 370/345, 389–390, 392, 394, 395.1, 396–397, 370/395.4, 428–429, 432, 465

See application file for complete search history.

(56) References Cited

U.S. PATENT DOCUMENTS

| | | | | |
|---|---|---|---|---|
| 6,674,731 | B1* | 1/2004 | Bradshaw et al. | 370/316 |
| 7,974,209 | B1* | 7/2011 | Maufer et al. | 370/241 |
| 2010/0202457 | A1* | 8/2010 | Denney et al. | 370/392 |

\* cited by examiner

*Primary Examiner* — Kevin Mew
(74) *Attorney, Agent, or Firm* — J. Wiley Horton (57) ABSTRACT

A system and method for using multiple peer listeners in order to improve the ability to receive a transmitted signal. A peer link is established between the peer listeners. At least some of the peer listeners also have a data link to a sender communicating with an outside source. In the simplest embodiment, a peer listener receiving data over the sender data link communicates that data to one or more other peers which may have an impaired ability to presently utilize its own data link to the sender. In more complex embodiments, multiple peer listeners can receive and process portions of needed data over the data link to the sender, then communicate portions of the data to other peer listeners on an as-needed basis.

20 Claims, 4 Drawing Sheets

OPPORTUNISTIC LISTENING SYSTEM AND METHOD

CROSS-REFERENCES TO RELATED APPLICATIONS

This application claims the benefit, pursuant to 37 C.F.R. section 1.53(c) of an earlier filed provisional application. The earlier application was assigned application Ser. No. 61/374,073. It was filed on Aug. 16, 2010.

STATEMENT REGARDING FEDERALLY SPONSORED RESEARCH OR DEVELOPMENT

This research was sponsored by a grant from the U.S. Army Research Laboratory.

MICROFICHE APPENDIX

Not Applicable

BACKGROUND OF THE INVENTION

1. Field of the Invention

This invention relates to the field of communication. More specifically, the invention comprises a system and method for using communications between two or more peer listeners in order to improve the ability to receive transmitted data.

2. Description of the Related Art

Many modern communication devices have two or more communication links. A good example is a cellular phone with Internet capability. Such phones have a traditional cellular network link—such as GPRS, EDGE, EVDO, 3G, etc. Such phones also have a wireless local area network interface—such as WiFi. The cellular network link has substantial range and connects the device to a broad network of cell towers. However, the cell link has relatively low capacity, longer latency, and is in often heavily loaded by requests from many cell phones.

The WiFi link has limited range, but has a much higher capacity and is often lightly loaded. The WiFi link may also be used for peer-to-peer communications between cell phones in the same area. In this context the cellular network link is referred to as the "sender link" and the WiFi link is referred to as the "peer link."

Those skilled in the art will realize that the combination of a sender link and a peer link is possible in many applications beyond cellular telephones. One additional example is the existence of satellite data links with individual nodes which are also tied together using a wireless local area network.

The examples may be generalized to encompass many different environments. Many such environments will involve network nodes which come and go, and may even involve sender links to more than one source or multiple simultaneous sources. An area of particular interest is the field of mobile ad hoc networks ("MANETs"). A MANET typically has a changing structure as members enter and leave the network. These often include a "one-to-many" data dissemination pattern, but may also include a "many-to-many" pattern.

An example is "Blue Force Tracking" where a tactical military network seeks to maintain intra-force communication in order to coordinate the force's activities. It is preferable to provide a flexible architecture in this setting, where the system can appropriately disseminate information without requiring knowledge regarding specific routing or hierarchies. It is also preferable to provide a system which can continually operate despite the temporary or permanent loss of one or more nodes.

Researchers have devised several techniques for improving the efficiency of multicast communications in MANETs and tactical edge networks. The term "multicast" means the dissemination of information simultaneously to more than one node that may be interested in receiving the information rather than to only a single node at a time.

Cooperative networking allows the peers of the network to cooperate in order to increase network performance. Techniques such as cooperative data caching and cooperative data recovery promote greater network availability and survivability. Wireless communication is inherently a broadcast medium and the nature of this medium can be exploited to efficiently communicate with groups of nodes at the same operational cost as a communication to a single designated node (a "unicast"). Packet erasure coding may also be used to minimize transmission errors, though this technique reduces efficiency by requiring the transmission of redundant data.

There presently exist several reliable multicast communication protocols that were specifically designed for disseminating information to multiple nodes in a network. These protocols are often realized in the form of "middleware"—meaning software that connects different software components (often components which are running on different computers and possibly even on different operating systems—a common scenario in the field of communication). One existing protocol is known as "NORM," which stands for NACK-Oriented Reliable Multicast protocol. A "NACK" is a message listing missing data packets which were not received by a receiver. NORM includes a reliability mechanism that is based on the combination of Automatic Repeat Requests ("ARQ's") and erasure coding.

Another protocol is "OpenPGM" which is an open source version of the Pragmatic General Multicast protocol. Yet another protocol is the JGroups protocol which is a communication middleware included in the "JBoss" middleware. OpenPGM and JGroups represent commercial off-the-shelf technology. Although both these systems were designed for wired communications, they are interesting reference points even for the wireless world.

Reliable multicast protocols fall into one of four categories depending on the mechanisms they employ to ensure reliability. The four mechanisms are: (1) Automatic Retransmission Request (ARQ); (2) gossip-based; (3) Forward Error Correction ("FEC"); and (4) hybrids of the other three.

ARQ-based systems use acknowledgements sent by the receiver (and possibly timeouts) to ensure reliable transmission. In some versions the sender is responsible for missing packet detection while in other versions the receiver will have this duty. In the former case the sender detects the missing packets based on not receiving acknowledgment messages ("ACK's") from the receiver(s) within a defined time interval. In receiver-initiated versions, the receivers send the list of missing packets ("NACK's") to the sender whenever the receiver receives a packet out of sequence (which implies that a prior packet is missing). It is also known to use a hybrid ACK/NACK approach.

ARQ-based systems may not scale well when the size of the network and the number of receivers increase. It is also generally true that the sender is exclusively in charge of the retransmission of missing packets ("repair traffic"). This characteristic means that the sender may become quite burdened by repair traffic when a large number of receivers are present.

In gossip-based systems data are sent in a peer-to-peer fashion. Each node receiving data may choose to forward the data to a subset of its neighbors. The decision is made locally, and may be based on probability or heuristic factors (taking network topological details into account). The main disadvantage to this approach is its non-deterministic delivery.

The approach based on Forward Error Correction sends redundant data (such as parity data) that allows a receiver to reassemble some or all of the lost data on its own. Erasure coding is a particular form of FEC that combines a set of k symbols to obtain a larger set of n transformed signals for which there exists a subset of symbols of size h that can be used to recover the original set. If any subset of size h of the transformed set is sufficient to recover the original set, the code is called optimal.

FEC cannot ensure reliability by itself, but it can be coupled with an ARQ-based approach to reduce the packet loss, which results in fewer retransmissions. NORM is a good example of a hybrid approach using ARQ and FEC. This hybrid approach allows the ARQ mechanism greater efficiency when providing repair traffic. As an example, when optimal erasure codes are used, a single repair packet can repair different packets at different receivers.

Erasure coding techniques are encoded at the source and decoded at the receivers. Different coding schemes (known as "network coding") allow intermediate nodes that receive the message to re-encode it.

An essential aspect of reliable multicast communication protocols is their reliance on underlying routing protocols. Multicast routing protocols build either routing trees or routing meshes. Both are costly to build and maintain in mobile networks where nodes tend to come and go. Many reliable multicast protocols need group-communication primitives to work.

Support for congestion control represents a critical aspect of reliable multicast communication protocols. Congestion control is in fact critical to the performance of mobile ad hoc networks ("MANET's") in a multicast environment.

Additional Explanation of Existing NORM Protocol and Prototype System:

NORM (NACK-oriented reliable multicast protocol) works well in MANETs and therefore serves as an effective baseline for evaluating the performance of the present invention. NORM implements a hybrid receiver-initiated ARQ-based multicast protocol that uses packet erasure coding. The packet coding is integrated with the ARQ mechanism. While the packet erasure coding can be provided proactively, it is also possible to provide it reactively. In the reactive case, a FEC packet is only sent in response to a NACK. In this way, the overhead introduced by the FEC mechanism is limited. The downside of this approach is slightly higher latency.

A tradeoff between bandwidth use and latency can be reached by using a hybrid between the proactive and reactive methods. A low level of proactive FEC is combined with reactive FEC (when reactive is necessary). NORM computes FEC over blocks of data. Every block of data is divided into a certain number of segments where a certain percentage of these segments contain FEC data. The user may configure the number of data segments containing FEC data.

NORM provides congestion control via a "TCP friendly" algorithm or through an Explicit Congestion Notification algorithm. In order to control congestion, NORM uses specific control packets that are part of its command set.

Additional Explanation of Existing OpenPGM System:

As stated previously, Open PGM is an implementation of the Pragmatic General Multicast protocol. It uses receiver initiated Automatic Repeat Requests ("ARQ's"). The system is reliable in a MANET environment only within a receiver-managed transmit window where the repair traffic is supplied by either the sender of the message or by designated local repairing nodes ("DLR's"). When a receiver detects missing packets, it sends a NACK request (a list of missing data packets) to the source via unicast. NACKs are propagated reliably to the source following the distribution tree of the source. The result is that the source usually receives only a single copy of the NACK.

When the receiving node receives the data packets requested in the NACK, it will "toggle" to a repair state. The receiving node will then propagate the data along its distribution state. If the repair state is not set, it will not propagate the data. This ensures that repair traffic is sent only along the branches that reach the requesting node. PGM senders can also use forward error correction. OpenPGM also uses a TCP friendly congestion control algorithm.

Additional Explanation of JGroups System:

JGroups is a toolkit for reliable multicast communication that is part of the JBoss suite of Java middleware. JGroups provides a configurable protocol stack that lets the user choose between the different protocols of the channel. In the jargon of JGroups, a channel is a group communication endpoint. The channel is comprised of several blocks that implement network protocols. JGroups offers different alternative protocols for each block. The stack's blocks are, in top-down order, as follows: flow control, group membership, reliable delivery, failure detection, discovery, and transport.

The system and method proposed in the present invention is particularly applicable to mobile ad-hoc networks (MANETs) having two separate means of available communication (a sender link and a peer link). The system shifts repair traffic from the sender link to the peer link. The system and method is also advantageous when it is more efficient and/or less expensive to communicate with peers as opposed to the original sender, even if they all share the same communications link.

BRIEF SUMMARY OF THE INVENTION

The present invention comprises a system and method for using peer-to-peer communications among multiple peer listeners in order to improve the ability to receive a transmitted signal from a sender. A peer link is established between the peer listeners. At least some of the peer listeners also have a sender data link communicating with an outside source. In the simplest embodiment, a peer listener receiving data over the sender data link communicates that data to one or more other peers which may have an impaired ability to presently utilize its own sender data link.

In more complex embodiments, multiple peer listeners can receive and process portions of needed data over the sender data link, then communicate portions of the data to other peer listeners on an as-needed basis. Some peer listeners can even be used to archive data received over the sender data link for subsequent retransmission to other peer listeners. The system shifts repair data traffic from the sender link to the peer link, which often has a better ability to service this traffic.

REFERENCE NUMERALS IN THE DRAWINGS

| 10 | cell phone | 12 | cell tower |
| 14 | sender link | 16 | peer link |
| 18 | structure | 20 | WiFi device |
| 22 | satellite | 24 | vehicle |
| 26 | obstacle | 28 | GPS link |
| 30 | soldier | 32 | overhead foliage |

DETAILED DESCRIPTION OF THE INVENTION

Figure 1:
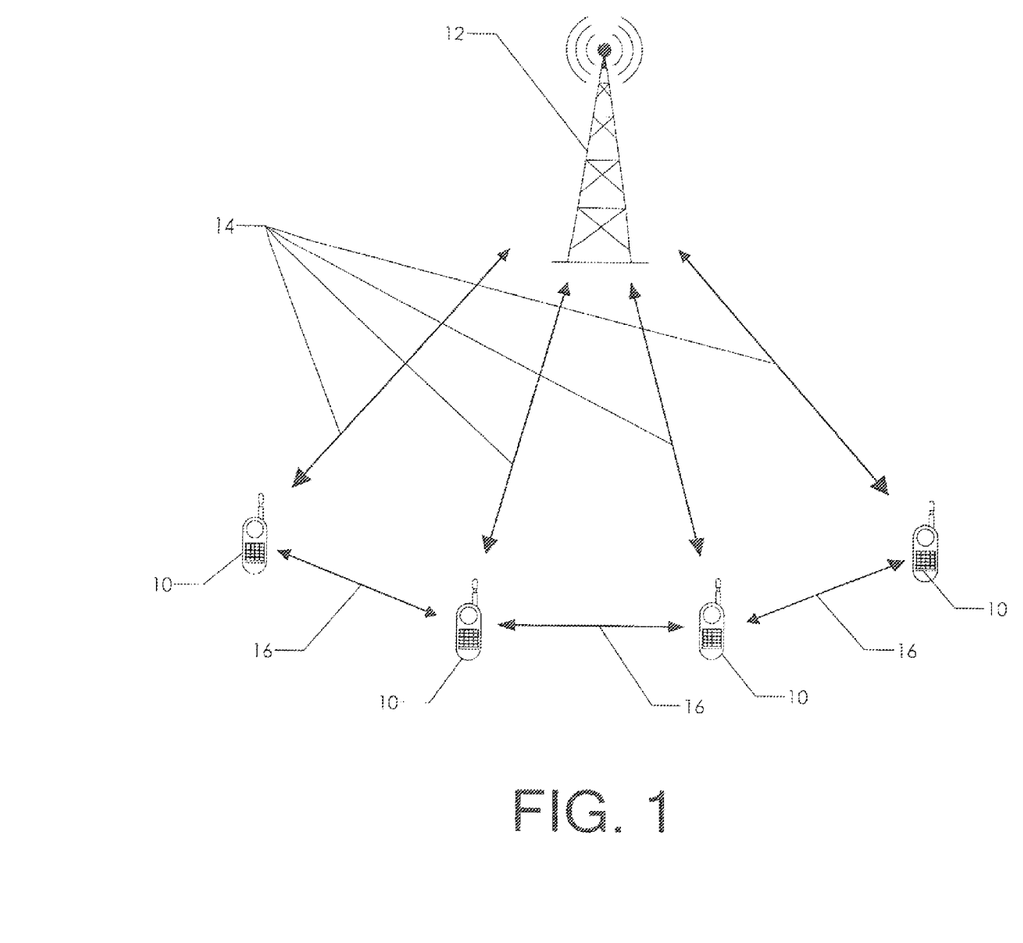
FIG. 1 is a schematic view of the peer links and sender links existing in a cellular phone communication system.

FIG. 1 schematically depicts a communication system having sender links and peer links. A plurality of cell phones 10 are in communication with a cellular network via cell tower 12. Each cell phone can communicate directly with the cell tower via a sender link 14.

Each cell phone can also communicate with the other cell phones via a peer link 16. This peer link can assume many forms. One example is the use of a wireless local area network. The four cell phones depicted might all be in the same facility and thereby in range of a WiFi network providing wireless router capability. Or, the cell phones could establish an ad-hoc WiFi network among themselves without the need for a pre-existing WiFi network. They could then communicate with each other directly, or by a more indirect method such as sending messages over the Internet.

Figure 2:
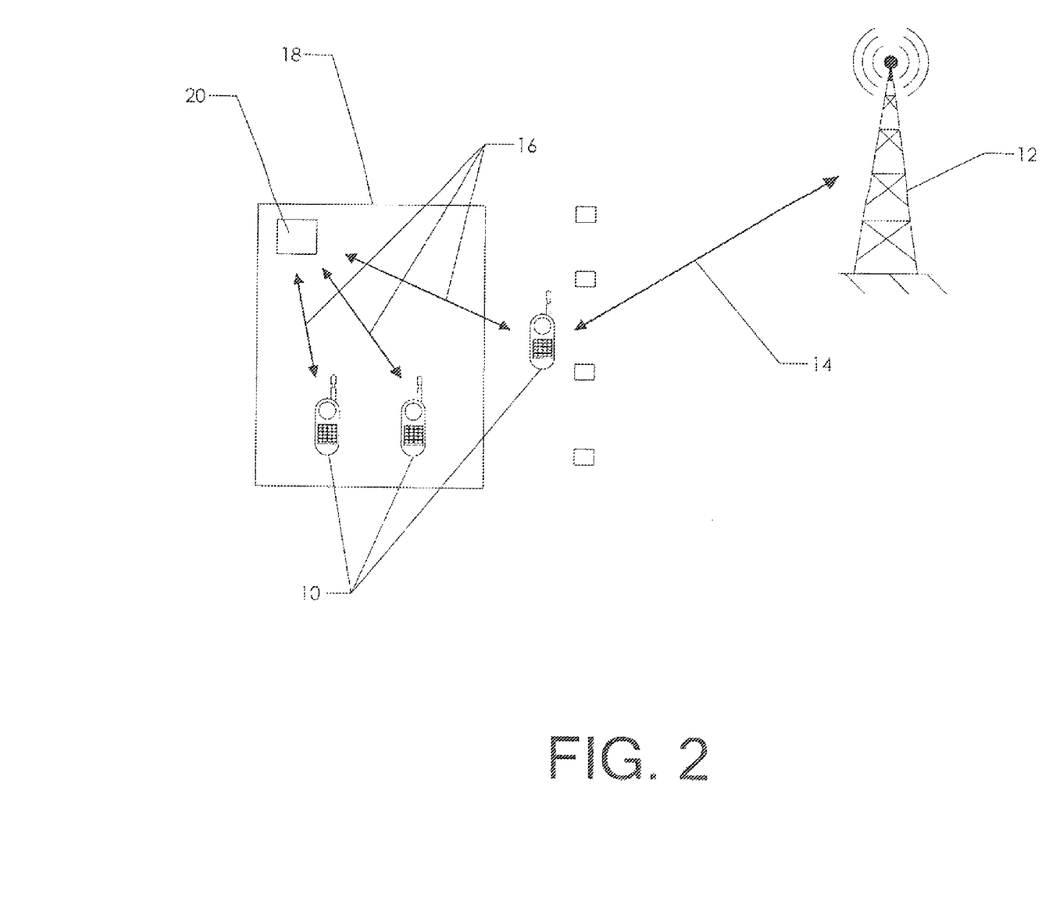
FIG. 2 is a schematic view, showing the use of a wireless local area network as a peer link.

The availability of the dual communication channels offers advantageous possibilities that are not immediately apparent from the depiction of FIG. 1. FIG. 2, however, shows a common situation familiar to many cell phone users. Structure 18 tends to block radio frequency signals. One cell phone 10 is located outside the occluding portions of structure 18. Two other cell phones 10 are located inside structure 18.

WiFi device 20 is located proximate structure 18 and provides a wireless local area network throughout the immediate vicinity (Those skilled in the art will know that WiFi networks often use repeaters and remote antennas to provide good coverage throughout a structure and even the outside area surrounding the structure). Even in the absence of such network infrastructure, the close proximity of cell phone devices 10 enables them to communicate more reliably over peer link 16 than sender link 14. In this example, only the cell phone 10 outside the structure is able to establish a sender link 14 with cell tower 12.

When a user holding one of the cell phones 10 inside the structure attempts to download data, the weak cell signal may cause a significant portion of the data to be lost. However, since the data transmitted from the cell network is broadcast it may be received by all the cell phones shown in FIG. 2. The cell phone in the user's possession can be configured to query all its peers currently shown on the network in order to determine if any phone on the network received the missing data. The missing data will likely be found on the phone outside structure 18, as it has the strongest reception. The missing data can then be sent between the cell phones on a peer-to-peer basis. There may be a variable transmission delay and the user can be informed of this fact. Using the devices currently available, however, the transmission delay will in many instances not be noticeable.

Figure 3:
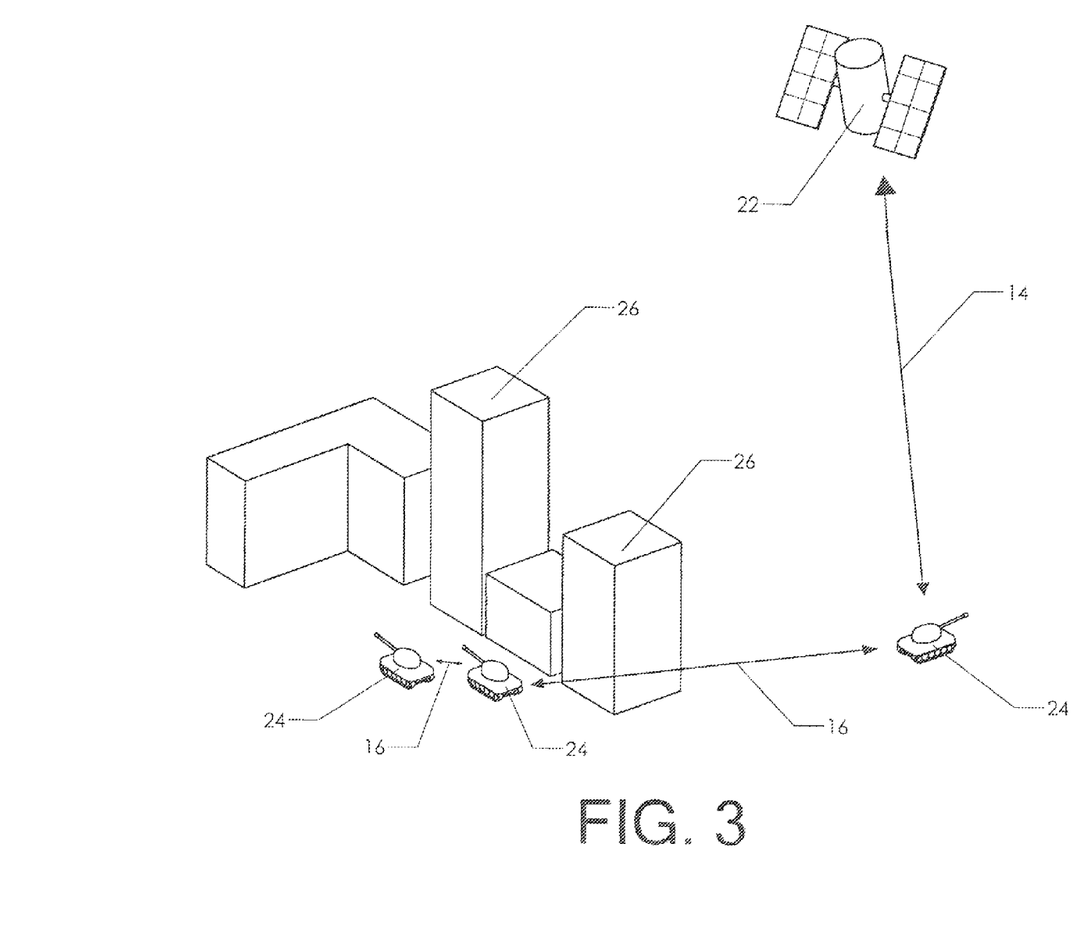
FIG. 3 is a schematic view, showing the use of satellite communication as the sender link and an encrypted radio frequency signal as the peer link.

FIG. 3 shows another embodiment employing different types of communication links. Three vehicles 24 are engaged in a tactical situation. One vehicle is in open terrain and has established sender link 14 with satellite 22. Two other vehicles 24 are maneuvering in a dense urban environment in which various obstacles 26 prevent direct receipt of a satellite signal.

Peer links 16 are established between the three vehicles 24 using encrypted radio frequency signals. The frequency is selected to allow reliable communication despite the existence of relatively dense line-of-sight obstacles. The exposed vehicle 24 communicates with satellite 22 and then relays information to and from the other vehicles 24 using peer links 16.

Figure 4:
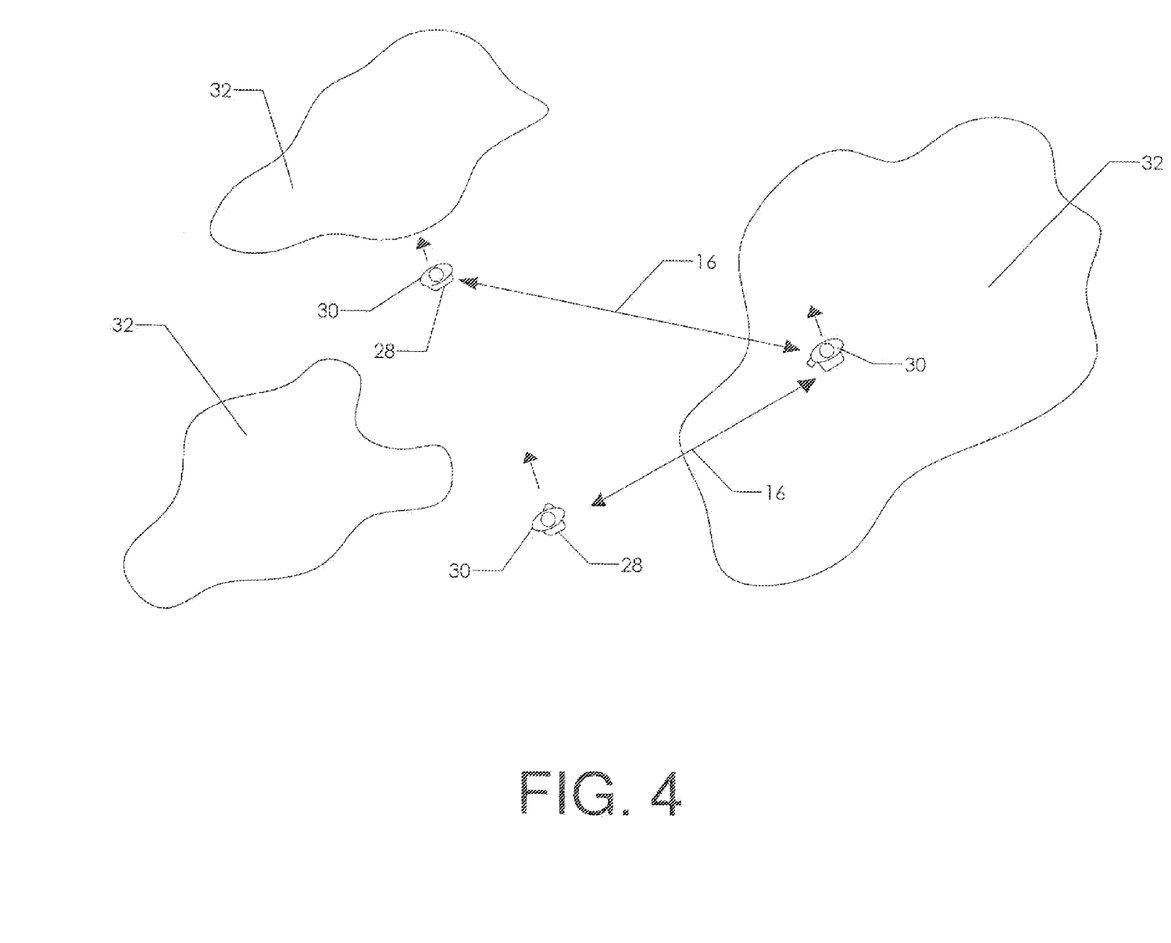
FIG. 4 is a schematic view, showing the application of the present invention to soldiers moving through overhead foliage.

FIG. 4 shows still another embodiment of the present invention. Three soldiers 30 are moving through foliage. Overhead foliage 32 occurs in patches as depicted. This overhead foliage periodically blocks receipt of GPS navigation signals—denoted as GPS link 28 (a form of sender link).

In the scenario illustrated, the soldier 30 on the right is walking beneath dense overhead foliage 32. He cannot receive a GPS signal while beneath the dense foliage. The two other soldiers 30, however, are walking in the open and are receiving a GPS signal. Encrypted radio peer links 16 are established between the soldiers. These allow the GPS location data—to be passed to the soldier walking under the dense foliage.

Of course, the soldier beneath the foliage is in a different location than the soldiers that are actually receiving GPS data. Thus, simply relaying the GPS data will not provide his precise location. However, it is possible to provide a triangulation function using a variety of known methods that would allow the triangulation of the position of the soldier underneath the foliage based on the known position of the other two soldiers. It is also possible to average the position of all the peers currently receiving GPS data and provide that as an estimated position—along with a statistical error value for that position. All of these operations can be performed using software in a small computing device.

Another application for the invention concerns the reception of satellite radio signals in automobiles. Satellite radio signals are frequently lost when passing through tunnels, going under bridges, and driving in areas containing tall buildings. However—in nearly all these cases—another automobile nearby will be receiving a satellite signal. A peer to peer network can be established among the automobiles in an area. Opportunistic listening can then be used to determine which vehicles have good reception and which vehicles are suffering "dropouts." Data can then be transferred to eliminate the dropouts. This will require a small amount of time. However, as those skilled in the art know, satellite receivers use a small delay to perform forward error correction and this time period can be used to replace lost data as well.

The intelligent use of peer and sender links could also be used to solve other problems existing in networks like cell phones. Users often wish to stream media-rich data (like videos) to their cell phones. One approach is similar to that used for satellite radio, where there is a shared channel being used by multiple peers (such as for live TV). Opportunistic listening would be used so that peers would receive missing data from other peers who successfully received it.

A more complicated scenario involves "on demand" video, where a single peer might wish to receive and view data that no other peer is using. In this case, the bandwidth requirements on the cellular network are much greater, in that each recipient wishing to view an "on demand" program would need a separate channel. Memory capacity in peer mobile phones in the network could be used to archive popular media for a period of time, making it available to other mobile phones that later wish to view the same content.

A detailed explanation of some particular embodiments of the present invention may aid the reader's understanding. The invention works well in wireless networks, including infrastructure-based networks such as cellular networks and mobile ad hoc networks (MANETs). Communication in such a network is preferably made using radio frequency (RF) wireless technologies. In an RF environment, the cost to the sender of a broadcast signal which is available to all nodes within reach is the same as a unicast signal directed to one particular node. The preferred embodiments of the invention rely on broadcast for both data and control messages.

The fact that a broadcast signal is used means that neighboring peer nodes receive the message even when they are not the intended target. The peers can store received packets in a cache, and retransmit them to other peers if requested. The peers thereby actively participate in the repair of missing messages, fragments, or broken communication paths. These activities are a primary component of Opportunistic Listening.

Of course, it is impractical to have every peer save everything it receives in case it might be needed elsewhere. It is preferable to provide a mechanism whereby each peer can logically decide what to keep and what to discard. To facilitate these local decisions, every broadcast message has attached metadata that makes the message self-describing and self-contained. Each message may therefore be interpreted by any peer receiving it.

The inventive method supports any combination of reliable/unreliable and ordered/unordered communication. These requirements are generally group-based and it is preferable to allow the requirements to be set by the software application which is "subscribing" to the group.

In the inventive method, every message fragment broadcast is assigned a unique identifier that includes the group the message belongs to, the ID of the node that broadcast or published the message, and a sequence ID. Every node keeps track of the messages that have been completely received, making it straightforward to identify missing messages/fragments. By default, messages with sequence ID's lower that the sequence ID of the first message received will not be requested by a node. However, the header of every message contains the recommended number of prior messages the peer may want to retrieve to make sense of the message it has in its possession (part of the self-describing function). The decision of whether to retrieve historical messages is up to the subscribing software application running on the node.

To ensure reliability the invention preferably uses a receiver-initiated Automatic Repeat Request ("ARQ") mechanism. The mechanism is based on probabilistic lists of missing data packets (NACKs), where the word "probabilistic" means that a single NACK message (often called a Missing Fragment Request, or "MFR") specifies a random subset of the total quantity of missing messages/fragments in order to minimize requests for the same message/fragment in subsequent requests. This feature is based on the reasonable assumption that if one node is missing a message fragment, then other nodes are likely missing the same fragment. Since each MFR is broadcast to all available nodes on the peer communication link, it is inefficient to have multiple nodes requesting the same missing fragment.

All nodes retain a Network Traffic Memory ("NTM") of recently broadcast messages on both the sender link and the peer link. Thus, a particular node will receive a MFR sent by another node and will also likely receive the message over the peer link which serves the MFR (by sending the missing data fragment). As an example, a particular node ("Node 1") might be missing four specific message fragments, which will be referred to simplistically as MF9 through MF12. Node 1 randomly chooses MF11 and broadcasts a Missing Fragment Request seeking MF11. While it is awaiting a response, Node 1 also "hears" over the peer link Missing Fragment Requests for MF9, MF10, and MF12. Thus, Node 1 "knows" that it no longer needs to send an MFR for these missing fragments. Node 1 then receives the missing fragment data from other peers responding to the request.

As a continuation of this example, Node 1 might receive other message fragments in the initial broadcast from the sender. These will be referred to as MF1 through MF8. Node 1 "hears" over the peer link a MFR seeking MF7. Node 1 then "serves" this MFR by broadcasting MF7 over the peer link.

The reader will thereby understand how each node can both seek and give assistance to other nodes. In the present inventive system repair traffic is serviced by other peers when possible rather than the original sender of the message, resorting to the original sender only when necessary.

NACKs are sent by broadcast, and they are sent only when the incoming traffic is a configurable fraction of the capacity of the interface (so that NACKs will not consume too much of the available bandwidth). Missing messages are requested until they are actually received. However, a "backoff" mechanism is used to increment the interval in which a missing message/fragment is requested. Upon arrival of a new peer in the network, or new data, these time intervals are reset and the backoff process begins a new cycle.

Since the MFR's (missing fragment requests) are broadcast, they are received by all peers in the network (subject to transient problems, of course). This feature allows many peers to serve the request. It would be inefficient for multiple peers to reply to the same MFR. The nodes in the network preferably keep track of all the messages which have been transmitted on the network in the last time window (possible because of the broadcast communication environment) and the nodes store each message ID in a data structure called the Network Traffic Memory ("NTM"), located at each node.

If a MFR is received and the requested message or fragment is known by reference to the NTM to have already been served, the request is not served a second time. At each node receiving the MFR, a random amount of time is allowed to elapse before the request is served. In this way it is unlikely that multiple peers will serve the same MFR at the same time, thus nullifying the advantage of the NTM. Of course, a response to the MFR will be broadcast throughout the network. Thus, once a particular node learns that a response has been sent by another node, it will not send a response to the MFR (unless another MFR is broadcast).

The reader will thus perceive that the present invention does not use any particular multicast protocol. Instead, it uses broadcast and probabilistic flooding or epidemic protocols to spread the information. Alternative routing protocols may be added to the system if desired. Peer nodes are not required to exchange membership knowledge. However, alternate solutions that do share use and membership knowledge could also be incorporated if desired.

Comparison of Inventive Method to Existing Technology:

A specifically described implementation of Opportunistic Listening was compared to prior technology in order to evaluate its strengths and weaknesses. The prior technology evaluated was NORM (Nack-oriented reliable multicast protocol), OpenPGM (an open protocol for Pragmatic General Multicast), and JGroups (part of the JBoss suite of Java middleware).

Since one objective of Opportunistic Listening is good performance in a mobile ad hoc network (MANET) environment, the evaluations were directed to this environment. However, it would be very expensive to actually deploy multiple peer nodes in an environment simulating mobile operations. Accordingly, the evaluation was conducted using a tactical network evaluation test bed based on the Mobile Ad-Hoc Network Emulator (MANE), which allows the evaluation of different systems in a reproducible and controlled laboratory environment. The test bed allows independent control of the capacity, reliability, and latency of each network link.

In many respects, an emulation test bed offers an advantage over actual field testing. A field test inevitably encounters variability in transmission conditions and other factors which make it difficult to ensure that each system being tested is operating under the same conditions. Instead, the test bed allows the emulation of realistic variations while presenting the exact same environment to each system being tested.

One aspect of the behavior of MANE is the way it handles reliability. In MANE, reliability is independently enforced for each link between a pair of nodes. Reliability is also enforced randomly on a packet-by-packet basis. This model allows meaningful emulation for the network. However, those skilled in the art will know that actually deployed MANET's do not behave in this way. In an actual MANET two particular nodes might have consistently more reliable transmissions (because they are physically close together) than two other nodes (which are physically far apart). As an example, in MANE, the reliability between a sender and a set of receivers can be specified as 80%. When the system runs, an average of 80% of the data packets will be successfully delivered to each receiver.

The evaluation was initially conducted with only one sender and one receiver—a situation in which Opportunistic Listening would not be expected to show a benefit. A second evaluation was then conducted with one sender and three receivers. In this scenario, when the bandwidth and reliability were constrained to realistic levels, JGroups and OpenPGM were not able to fully complete the reception of messages in a time comparable to NORM and Opportunistic Listening. In other words, with increasing network complexity and decreasing transmission reliability, it became apparent that JGroups and OpenPGM would not be viable solutions. NORM, however, continued to perform well. It was therefore decided to compare Opportunistic Listening to NORM in a more realistic simulation involving a tactical network.

A Tactical Network Test was devised, in which the sender communicates through an asymmetric and constrained link. Ten peers are used, but the number of receivers "interested" in receiving a particular message is three. In other words, ten peers may potentially receive the message (which is broadcast to all), but only three will find it relevant to the subscribing application actually running on that peer. This paradigm of course suits the present invention, but it is a realistic scenario in mobile ad hoc networks.

NORM was configured to perform as well as possible in the Tactical Network Test. As mentioned previously, NORM may be operated in a reactive mode (sending replacement packets in response to NACK's) or a proactive mode (sending forward error correction). The test was performed for both modes. When the sender link was configured as symmetric, NORM was configured in reactive mode. However, when the link was configured as asymmetric, it was observed that using the proactive mode produced better performance. In proactive mode, NORM was configured to use proactive forward error correction (FEC) of approximately 33% of the available bandwidth. The actual value depends upon the message size. As an example, for messages of 7,168 bytes, the FEC overhead is 2 segments, which makes the real overhead 39%.

A NORM message of 1 KB had no FEC because the smallest overhead that would have been added by the FEC was larger than the message itself (and thus it would be more efficient to simply re-transmit the message).

The Opportunistic Listening ("OL") system was configured to send Missing Fragment Requests (MFR's) with a frequency which is a function of the nominal capacity of the communications link. The nodes were configured to respond to MFR's only if the network traffic was below 80% of the maximum link capacity. The nodes were also configured to keep a history of recent messages. The rate limit of the nodes was set to give priority to the sender, with the remaining capacity being split between the receivers. The payload size was set to be 1,400 bytes for each message.

In keeping with OL's use of peer links for data correction (rather than the sender link), the sender in the OL network was configured to avoid replying to MFR's (missing fragment requests). This was true for both the symmetric and asymmetric link scenarios, thereby taking advantage of cooperative networking. The nodes in OL share the network, leaving the sender all the bandwidth needed and sharing the remainder equally among the receivers.

The results of the tactical network test are presented in the following tables. In the first table the sender link reliability was set at 90%. OL was compared against NORM running in the proactive mode (pfec) and the reactive mode (rfec). The size of the message transmitted was varied from 1024 bytes to 35840 bytes. With a high level of transmission link reliability (90%), the performance of the three systems was roughly comparable, but OL did demonstrate a significant advantage. While the success rate of NORM was close to OL, it did not transmit as many messages as OL. In other words, OL had a higher message throughput even though reliability was comparable in some cases. The results are shown in the following table:

| Message Size (Bytes) | Messages Sent | | | Messages Received | | | Success Rate (%) | | |
|---|---|---|---|---|---|---|---|---|---|
| | | NORM | | | NORM | | | NORM | |
| | OL | pfec | rfec | OL | pfec | rfec | OL | pfec | rfec |
| 1024 | 1578.0 | 1604.5 | 1274.5 | 1577.7 | 1453.2 | 1272.5 | 100.0 | 90.6 | 99.8 |
| 7168 | 228.0 | 170.0 | 189.0 | 228.0 | 157.5 | 188.5 | 100.0 | 92.6 | 99.7 |
| 15360 | 108.0 | 87.0 | 93.0 | 107.0 | 81.3 | 92.5 | 99.1 | 98.1 | 99.8 |
| 35840 | 46.0 | 36.0 | 40.5 | 46.0 | 35.3 | 40.0 | 100.0 | 98.1 | 99.8 |

The test was then run again with the sender link reliability being reduced to 80%. OL continued to perform well. The reader will observe, however, that the performance of the proactive version of NORM (pfec) fell away considerably in the results:

| Message Size | Messages Sent | | | Messages Received | | | Success Rate (%) | | |
| | | NORM | | | NORM | | | NORM | |
| (Bytes) | OL | pfec | rfec | OL | pfec | rfec | OL | pfec | rfec |
| --- | --- | --- | --- | --- | --- | --- | --- | --- | --- |
| 1024 | 1578.0 | 1599.5 | 978.0 | 1577.7 | 1275.7 | 975.7 | 100.0 | 79.8 | 99.8 |
| 7168 | 228.0 | 167.0 | 157.0 | 228.0 | 115.5 | 155.5 | 100.0 | 69.2 | 99.0 |
| 15360 | 107.0 | 86.0 | 81.0 | 107.0 | 50.8 | 80.0 | 100.0 | 59.1 | 98.8 |
| 35840 | 46.0 | 36.0 | 35.0 | 46.0 | 22.8 | 34.5 | 100.0 | 63.4 | 98.6 |

The random imposition of reliability between nodes in MANE testbed introduces some random variation in the tests. Although OL would be expected to perform well with decreasing transmission reliability—and in fact it obviously did—the reduction in transmission reliability should not produce an increase in performance. Thus, the very slight increase in OL's performance which occurred when the reliability was reduced from 90% to 80% is likely the result of a random variation in MANE. The reactive version of NORM (rfec) continued to perform fairly well at the 80% level. However, as will be explained in the following, the performance of NORM (rfec) could only be maintained through a significant increase in sender overhead (since the sender must service the repair traffic in this configuration).

The test was then run again with the sender link reliability being reduced to 70%. The results are contained in the following table:

| Message Size | Messages Sent | | | Messages Received | | | Success Rate (%) | | |
| | | NORM | | | NORM | | | NORM | |
| (Bytes) | OL | pfec | rfec | OL | pfec | rfec | OL | pfec | rfec |
| --- | --- | --- | --- | --- | --- | --- | --- | --- | --- |
| 1024 | 1578.0 | 1608.5 | 812.5 | 1576.3 | 1129.3 | 808.3 | 99.9 | 70.2 | 99.5 |
| 7168 | 228.0 | 166.0 | 129.5 | 228.0 | 74.3 | 127.0 | 100.0 | 44.8 | 98.0 |
| 15360 | 108.0 | 84.0 | 67.5 | 107.0 | 26.7 | 66.3 | 99.1 | 31.7 | 98.3 |
| 35840 | 46.0 | 34.5 | 30.0 | 46.0 | 9.5 | 29.5 | 100.0 | 27.5 | 98.3 |

OL continued to perform quite well. NORM (pfec) continued to deteriorate, especially with larger messages. NORM (rfec) continued to provide good reliability, but it suffered an additional and significant decrease in throughput.

The test was then run a final time with the sender link reliability being reduced to 50%. The results are shown in the following table:

| Message Size | Messages Sent | | | Messages Received | | | Success Rate (%) | | |
| | | NORM | | | NORM | | | NORM | |
| (Bytes) | OL | pfec | rfec | OL | pfec | rfec | OL | pfec | rfec |
| --- | --- | --- | --- | --- | --- | --- | --- | --- | --- |
| 1024 | 1578.0 | 1615.5 | 528.0 | 1574.0 | 810.2 | 517.8 | 99.8 | 50.1 | 98.0 |
| 7168 | 228.0 | 166.0 | 84.0 | 227.0 | 21.2 | 81.2 | 99.6 | 12.8 | 96.6 |
| 15360 | 108.0 | 82.0 | 46.0 | 106.0 | 5.2 | 44.0 | 98.2 | 6.3 | 95.7 |
| 35840 | 46.0 | 32.3 | 20.0 | 46.0 | 3.7 | 19.7 | 100.0 | 11.4 | 98.3 |

OL again performed quite well. NORM (pfec) deteriorated further. NORM (rfec) did not perform as well as OL, but still achieved reasonable reliability. However, in evaluating and comparing the systems, one must obviously consider the "sender overhead" (the number of bytes/messages sent by the sender in order to successfully transmit the data).

An increase in sender overhead decreases message throughput. The sender link is the "sender link" in this context. NORM (rfec) uses the sender to handle repair traffic. OL does not. OL shifts the repair traffic to the peer link, which typically has much more available capacity. In OL the sender overhead will naturally be reduced but peer-to-peer ("P2P") overhead will be increased. The tables that follow present the overhead numbers for the same Tactical Network Tests discussed previously. The overhead results with the sender link reliability at 90% are shown in the following table:

| Message Size | Success Rate (%) | | | Sender Overhead (Bytes/messages) | | | P2P Overhead (Bytes/messages) | | |
| --- | --- | --- | --- | --- | --- | --- | --- | --- | --- |
| | | NORM | | | NORM | | | NORM | |
| (Bytes) | OL | pfec | rfec | OL | pfec | rfec | OL | pfec | rfec |
| 1024 | 100.0 | 90.6 | 99.8 | 139.0 | 122.2 | 417.0 | 558.2 | 24.7 | 32.8 |
| 7168 | 100.0 | 92.6 | 99.7 | 834.0 | 3564.5 | 2487.2 | 4050.9 | 25.5 | 175.5 |
| 15360 | 99.1 | 93.5 | 99.5 | 1551.1 | 5542.2 | 4191.5 | 7765.0 | 33.9 | 267.9 |
| 35840 | 100.0 | 98.1 | 99.8 | 3753.0 | 14700.6 | 9063.6 | 36798.0 | 54.0 | 410.5 |

The reader will observe that in OL, the sender overhead is roughly proportional to the message size. NORM (rfec) has a fairly low sender overhead compared to NORM (pfec). This results from the fact that few NACK's are sent when the sender link reliability is 90%. Even so, for all but the smallest message size, OL has a lower sender overhead than either configuration of NORM. On the other hand, OL has a much higher P2P (peer-to-peer) overhead since it is the peers that handle the repair traffic in the OL scheme.

The overhead results with the sender link reliability set to 80% are presented in the following table:

| Message Size | Success Rate (%) | | | Sender Overhead (Bytes/messages) | | | P2P Overhead (Bytes/messages) | | |
| --- | --- | --- | --- | --- | --- | --- | --- | --- | --- |
| | | NORM | | | NORM | | | NORM | |
| (Bytes) | OL | pfec | rfec | OL | pfec | rfec | OL | pfec | rfec |
| 1024 | 100.0 | 79.8 | 99.8 | 139.0 | 126.0 | 853.9 | 909.8 | 35.9 | 60.7 |
| 7168 | 100.0 | 69.2 | 99.0 | 834.0 | 3768.5 | 4447.1 | 6990.5 | 107.3 | 388.9 |
| 15360 | 100.0 | 59.1 | 98.8 | 1668.0 | 5803.2 | 7093.9 | 13373.9 | 142.8 | 425.7 |
| 35840 | 100.0 | 63.4 | 98.6 | 3753.0 | 14708.2 | 16123.1 | 32581.4 | 156.4 | 574.3 |

The sender overhead for OL will remain constant despite the decreasing sender link reliability (since the sender in OL does not handle repair traffic). The reader will observe that the P2P overhead for OL has increased with respect to the 90% test, as would be expected since the peers are required to handle more repair traffic. The P2P overhead in both versions of NORM also increases, but this is not a significant factor.

By the time the transmission link is down to 80%, proactive NORM is unable to reliably transmit the messages. Reactive NORM is able to maintain good reliability, but reactive NORM's continued performance is obtained only by significantly increasing the sender overhead. When the sender link reliability drops from 90% to 80%, NORM(rfec)'s sender overhead nearly doubles.

The previously-discerned trends continue as the sender reliability link drops to 70% and then to 50%. The results with the sender link reliability set to 70% are presented in the following table:

|  | Success Rate (%) | | | Sender Overhead (Bytes/messages) | | | P2P Overhead (Bytes/messages) | | |
|  | NORM | | | NORM | | | NORM | | |
| Message Size (Bytes) | OL | pfec | rfec | OL | pfec | rfec | OL | pfec | rfec |
| --- | --- | --- | --- | --- | --- | --- | --- | --- | --- |
| 1024 | 99.9 | 70.2 | 99.5 | 139.0 | 119.4 | 1236.4 | 1286.9 | 44.1 | 82.4 |
| 7168 | 100.0 | 44.8 | 98.0 | 834.0 | 3838.9 | 6911.5 | 8553.7 | 176.3 | 431.2 |
| 15360 | 99.1 | 31.7 | 98.3 | 1551.1 | 6308.5 | 11570.8 | 18423.7 | 284.2 | 576.5 |
| 35840 | 100.0 | 27.5 | 98.3 | 3753.0 | 16928.2 | 24778.2 | 41625.2 | 435.2 | 769.4 |

OL performs the best, but NORM (rfec) is able to produce reliable transmission. However, the sender overhead for NORM (rfec) has increased roughly threefold over the level obtained with 90% sender link reliability.

The results with the sender link reliability set to 50% are presented in the following table:

|  | Success Rate (%) | | | Sender Overhead (Bytes/messages) | | | P2P Overhead (Bytes/messages) | | |
|  | NORM | | | NORM | | | NORM | | |
| Message Size (Bytes) | OL | pfec | rfec | OL | pfec | rfec | OL | pfec | rfec |
| --- | --- | --- | --- | --- | --- | --- | --- | --- | --- |
| 1024 | 99.8 | 50.1 | 98.0 | 139.0 | 114.1 | 2454.4 | 1634.0 | 64.6 | 171.0 |
| 7168 | 99.6 | 12.8 | 96.6 | 834.0 | 3835.0 | 14512.5 | 11020.9 | 347.7 | 707.8 |
| 15360 | 98.2 | 6.3 | 95.7 | 1551.1 | 6839.9 | 24176.7 | 22086.6 | 520.2 | 978.9 |
| 35840 | 100.0 | 11.4 | 98.3 | 3753.0 | 21030.1 | 55108.0 | 53386.5 | 910.0 | 1501.4 |

NORM (rfec)'s sender overhead at this level is over five times what it was when the sender link reliability was set at 90%. The reader will observe that OL's sender overhead remains exactly the same.

Several significant things may be observed from this data. First, the sender in an Opportunistic Listening system has a fixed overhead which is solely dependent upon the size of the message sent. This feature results from the fact that the sender is given no "repair" duties (The sender does not respond to missing fragment requests). Second, one may easily observe that the success rate of the Opportunistic Listening System remains quite good as the sender link reliability deteriorates (remaining near 100% even for a sender link reliability of only 50%).

NORM can only maintain good reliability by using reactive data correction (rfec) and—as the sender link reliability deteriorates—the sender overhead increases dramatically. When NORM is operated using forward error correction (pfec) it cannot maintain an adequate success rate.

It is therefore apparent that OL is an effective solution—particularly for environments using asymmetric communication links (where the sender is not obligated to provide repair traffic). Such asymmetric links are found in many real-world situations. One example would be a sender located on an unmanned aerial vehicle (UAV). The UAV may only be over a particular network for a brief period of time. It broadcasts messages which may be received by all the peers in the network. However, the UAV may not be in contact long enough to provide repair traffic.

The use of OL lets the peers within the network perform the repair function. The peers are likely to be in communication for an extended period (with the term "extended" being a relative term that might only mean a minute to a few minutes). Thus, the peers can readily perform the repair function.

When an asymmetric link is used, the tabular data makes plain that OL has better performance than forward error correction (FEC) in terms of both success rate and the number of messages sent. OL's advantage becomes more pronounced with increasing message size. The high success rate is due to the cooperation among the receiving peers, since the probability that every peer will miss a particular fragment is quite low.

OL also enjoys a higher transmission rate from the sender, since no bandwidth is being allocated to FEC packets. The benefits of the OL approach become more pronounced as the sender link reliability declines. The reason for this is that, given a sufficient number of receiving peers, it is unlikely that all of them will lose the same fragment. With FEC, on the other hand, the overhead required to maintain reliability in the face of a low sender link reliability becomes enormous.

OL also produces advantages when used with a symmetric data link. When the sender link reliability is high in a symmetric environment, NORM (rfec) performs similarly to OL. However—as sender link reliability decreases—even reactive NORM cannot compete with OL. The reason is that the sender in a NORM (rfec) system is more and more occupied with repair traffic.

It should be noted that—whether asymmetric or not—the communication overhead between peers in an OL network is relatively higher. This "P2P" overhead also increases as the sender link reliability decreases (since more peer-to-peer repair traffic is needed). However, a typical P2P ground network between the receivers has considerably more capacity and it is therefore able to handle the increased load. In effect, OL shifts the work to the communication link which has the capacity to perform it.

The cellular phone example of FIG. 2 serves to illustrate a practical application of OL. Each cellular phone represents a node in a mobile ad hoc network. Several cellular phones may be in communication with a transmission tower over a "sender link." If a data request is served by the cellular network, the data can be broadcast so that it reaches all the nodes.

If the requesting node misses some of the data transmitted over the sender link, it can broadcast a MFR over the peer link. One or more of the nearby cellular phones will then serve the MFR over the peer link. Cellular phone networks are inherently a "broadcast" environment. A network transmitter attaches an identifier to most messages which alerts a particular receiving node that it should pay attention to the message. However, all the other nodes within range of the transmission also receive the message (though they typically ignore it). Thus, the use of OL in this context takes advantage of existing capacity which is typically sitting idle.

OL is often used in an environment with one sender and a plurality of receiving peer nodes. However, OL should not be viewed as limited to situations in which the objective is the transmission of a message to more than one receiving peer nodes. OL is useful even where the message is intended for only one receiving peer node. In this context the system is still useful because the other available receiving peer nodes are "opportunistic listeners" and they will still provide useful repair traffic if it is needed.

The sender communication link and the peer communication link are conceptually thought of as being separate but they may—in some embodiments—both be transmissions on a common radio frequency channel. In that scenario the sender might be able to "hear" a missing fragment request sent by one of the receiving peer nodes. However, in the OL system, the sender would ignore the MFR since OL assumes that the MFR will be served by the receiving peer nodes.

The examples provided have focused on radio frequency communications but OL is certainly not limited to this method of communication. It may be applied to other forms of communication and even environments involving multiple forms of communication. One example is the soldier-to-soldier network illustrated in FIG. 4. The sender in this context might use broadcast radio signals. However, it might be inadvisable to use radio signals for the peer communication link as such signals might disclose the unit's position. In this environment, one might use ultrasonic signals for the peer communication link. Optical signals within or outside the visible spectrum could also be used. OL could even be applied to underwater environments where the peer communication link might assume the form of subsonic acoustics.

In summary, the objective of opportunistic listening is to exploit the peer network in order to (a) reduce the load on the sender link; and (b) improve the reception of data from the sender link. Although the preceding descriptions contain significant detail, they should properly be viewed as disclosing examples of the inventions' many possible embodiments rather than limiting the scope of the invention. For instance, the present invention could use ultrasonic signals for the described soldier-to-soldier peer network instead of radio frequency signals. Many other embodiments are possible, with the scope of the invention properly being defined by the claims rather than any example provided.

Having described our invention, we claim:

1. A method of providing reliable communication between a sender and a receiving peer node, comprising:
   a. providing a sender;
   b. providing a plurality of receiving peer nodes;
   c. providing a broadcast, wireless sender communication link, said sender communication link being capable of broadcasting a message from said sender to each of said plurality of receiving peer nodes which is at a given instant able to receive said message;
   d. providing a broadcast, peer communication link among said plurality of receiving peer nodes;
   e. for each message fragment sent over said sender communication link and said peer communication link, assigning a unique identifier that includes the group said message fragment belongs to and a sequence identification;
   f. broadcasting a plurality of said message fragments from said sender to said plurality of receiving peer nodes over said sender communication link;
   g. each of said receiving peer nodes evaluating said message fragments received in order to determine a list of missing message fragments;
   h. for each of said receiving peer nodes which is missing a message fragment, randomly selecting a subset of said list of missing message fragments and broadcasting missing fragment requests corresponding to said selected subset over said peer communication link;
   i. each of said receiving peer nodes maintaining a network traffic memory including all missing fragment requests sent over said per communication link and all responses thereto;
   j. each of said receiving peer nodes, upon receiving a missing fragment request, waiting a randomly selected time interval before responding thereto; and
   k. each of said receiving peer nodes, upon reaching the end of said randomly selected time interval and upon determining that no other receiving peer node has serviced said missing fragment request, responding to said missing fragment request.

2. A method of providing reliable communication between a sender and a plurality of receiving peer nodes as recited in claim 1, wherein said peer communication link is separate from said sender communication link.

3. A method of providing reliable communication between a sender and a plurality of receiving peer nodes as recited in claim 2, wherein said sender communication link is a radio transmission on a first frequency and said peer link is a radio transmission on a second frequency.

4. A method of providing reliable communiation between a sender and plurality of receiving peer nodes as recited in claim 2, wherein said sender communication link is a radio transmission and said peer communication link is selected from the group consisting of radio transmission, ultrasonic transmission, optical transmission, and subsonic transmission.

5. A method of providing reliable communication between a sender and a plurality of receiving peer nodes as recited in claim 1, wherein each of said receiving peer nodes responds to a missing fragment request only if the total traffic on said peer communication link is below a configurable percentage of a total capacity of said peer communication link.

6. A method of providing reliable communication between a sender and a plurality of receiving peer nodes as recited in claim 1, wherein each of said receiving peer nodes responds to a missing fragment request only if the total traffic on said peer communication link is below eighty percent of a total capacity of said peer communication link.

7. A method of providing reliable communication between a sender and a plurality of receiving peer nodes as recited in claim 1, wherein if a missing fragment request remains unserved after a selected interval of time, one of said receiving peer nodes sends said unserved missing fragment request to said sender over said sender communication link and said sender then responds to said missing fragment request over said sender communication link.

8. A method of providing reliable communication between a sender and a plurality of receiving peer nodes as recited in claim 2, wherein each of said receiving peer nodes responds to a missing fragment request only if the total traffic on said peer communication link is below a configurable percentage of a total capacity of said peer communication link.

9. A method of providing reliable communication between a sender and :a plurality of receiving peer nodes as recited in claim 2, wherein each of said receiving peer nodes responds to a missing fragment request only if the total traffic on said peer communication link is below eighty percent of a total capacity of said peer communication link.

10. A method of providing reliable communication between a sender and a plurality of receiving peer nodes as recited in claim 2, wherein if a missing fragment request remains unserved after a selected, interval of time, one of said receiving peer nodes sends said unserved missing fragment request to said sender over said sender communication link and said sender then responds to said missing fragment request over said sender communication link.

11. A method of providing reliable communication between a sender and a plurality of receiving peer nodes, comprising:
   a. providing a sender;
   b. providing a plurality of receiving peer nodes;
   c. providing a broadcast, wireless sender communication link, said sender communication link being capable of broadcasting a message from said sender to each of said plurality of receiving peer nodes which is at a given instant able to receive said message.;
   d. providing a broadcast, peer communication link among said plurality of receiving peer nodes;
   e. for each message fragment sent over said sender communication link and said peer communication link, assigning a unique identifier that includes the group said message fragment belongs to and a sequence identification;
   f. broadcasting a plurality of said message fragments from said sender to said plurality of receiving peer nodes over said sender communication link;
   g. each of said receiving peer nodes evaluating said message fragments received in order to determine a list of missing message fragments;
   h. each of said receiving peer nodes sending a missing fragment request over said peer communication link for each missing message fragment found by said receiving peer node;
   i. each of said receiving peer nodes maintaining a network traffic memory including all missing fragment requests sent over said peer communication link and all responses thereto;
   j. each of said receiving peer nodes, upon receiving a missing fragment request, waiting a randomly selected time interval before responding thereto; and
   k. each of said receiving peer nodes, upon reaching the end of said randomly selected time interval and upon determining that no other receiving peer node has serviced said missing fragment request, responding to said missing fragment request.

12. A method of providing reliable communications between a sender and a plurality of receiving peer nodes as recited in claim 11, wherein said sender is located on an unmanned aerial vehicle.

13. A method if providing reliable communication between a sender and a plurality of receiving peer nodes as recited in claim 11, wherein said peer communication link is separate from said sender communication link.

14. A method of providing reliable communication between a sender and a plurality of receiving peer nodes as recited in claim 13, wherein said sender communication link is a radio transmission on a first frequency and said peer link is a radio transmission on a second frequency, 15. A method of providing reliable communication between a sender and a plurality of receiving peer nodes as recited in claim 13, wherein said sender communication link is a radio transmission and said peer communication link is selected from the group consisting of radio transmission, ultrasonic transmission, optical transmission, and subsonic transmission.

16. A method of providing reliable communication between a sender and a plurality of receiving peer nodes, comprising:
   a. providing a sender;
   b. providing a plurality of receiving peer nodes;
   c. providing a broadcast, wireless sender communication link, said sender communication link being capable of broadcasting a message from said sender to each of said plurality of receiving peer nodes which is at a given instant able to receive said message;
   d. providing a broadcast, peer communication link among said plurality of receiving peer nodes;
   e. for each message fragment sent over said sender communication link and said peer communication link, assigning a unique identifier that includes the group said message fragment belongs to and a sequence identification;
   f. broadcasting a plurality of said message fragments from said sender to said plurality of receiving peer nodes over said sender communication link;
   g. each of said receiving peer nodes evaluating said message fragments received in order to determine a list of missing message fragments;
   h. for each of said receiving peer nodes which is missing a message fragment, randomly selecting a subset of said list of missing message fragments and broadcasting missing fragment requests corresponding to said selected subset over said per communication link;
   i. each of said receiving peer nodes maintaining a network traffic memory including all missing fragment requests sent over said peer communication link and all responses thereto; and
   j. each of said receiving peer nodes, upon receiving a missing fragment request and upon determining that no other receiving peer node has serviced said missing fragment, request, responding to said missing fragment request.

17. A method of providing reliable communication between a sender and a plurality of receiving peer nodes as recited in claim 16, wherein said sender is located on an unmanned aerial vehicle.

18. A method of providing reliable communication between a sender and a plurality of receiving peer nodes as recited in claim 16, wherein said peer communication link is separate from said sender communication link.

19. A method of providing reliable communication between a sender and a plurality of receiving peer nodes as recited in claim 18, wherein said sender communication link is a radio transmission on a first frequency and said peer link is a radio transmission on a second frequency.

20. A method of providing reliable communication between a sender and a plurality of receiving peer nodes as recited in claim 18, wherein said sender communication link is a radio transmission and said peer communication link is an ultrasonic transmission.

* * * * *